United States Patent
Miyata et al.

(10) Patent No.: US 9,871,964 B2
(45) Date of Patent: Jan. 16, 2018

(54) PHOTOGRAPHING APPARATUS, PHOTOGRAPHING CONTROLLER, PHOTOGRAPHING CONTROL METHOD, AND PHOTOGRAPHING CONTROL PROGRAM

(71) Applicant: RICOH IMAGING COMPANY, LTD., Tokyo (JP)

(72) Inventors: Masashi Miyata, Tokyo (JP); Teppei Okamoto, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/174,003

(22) Filed: Jun. 6, 2016

(65) Prior Publication Data

US 2016/0366335 A1 Dec. 15, 2016

(30) Foreign Application Priority Data

Jun. 12, 2015 (JP) ................................. 2015-118809

(51) Int. Cl.
H04N 5/232 (2006.01)
G06T 7/44 (2017.01)

(52) U.S. Cl.
CPC .......... *H04N 5/23232* (2013.01); *G06T 7/44* (2017.01); *G06T 2207/20221* (2013.01); *G06T 2207/30168* (2013.01)

(58) Field of Classification Search
CPC .......... H01L 27/14625; H04N 5/23232; H04N 5/2251; H04N 5/23212; H04N 5/2327;

(Continued)

(56) References Cited

U.S. PATENT DOCUMENTS 6,661,932 B2   12/2003  Horikoshi
8,090,246 B2 *  1/2012  Jelinek ............... G06K 9/00604
                                                    348/296

(Continued)

FOREIGN PATENT DOCUMENTS

JP          3193258       5/2001
JP        2010-034964     2/2010

*Primary Examiner* — Pritham Prabhakher
(74) *Attorney, Agent, or Firm* — Greenblum & Bernstein, P.L.C.

(57) ABSTRACT

A photographing apparatus includes an image sensor configured to convert an object image formed by a photographing optical system, of the photographing apparatus, into electrical pixel signals, the photographing optical system including an optical element; and a photographing controller configured to control a photographing operation, in which a set of images for use in an image-synthesizing operation are photographed. During the photographing operation, the image sensor and the optical element are sequentially moved relative to each other from a reference position to relative positions in a direction different to a direction of the optical axis, wherein every time the photographing controller obtains a photographed image at each relative position, the photographing controller determines whether or not the photographed image satisfies usage testing-requirements for a constituent image of the set of images. A photographing controller, a photographing control method, and a photographing control program are also provided.

11 Claims, 10 Drawing Sheets

(58) Field of Classification Search
CPC .. H04N 5/23251; H04N 5/351; H04N 5/2353; G06T 5/50; G06T 2207/20221; G06T 2207/30168; G06T 7/44; G06K 9/4661; G06K 9/4652; G06K 9/4642; G06K 9/38
USPC .................................................. 348/219.1
See application file for complete search history.

(56) References Cited

U.S. PATENT DOCUMENTS

| | | | |
|---|---|---|---|
| 9,578,264 B2* | 2/2017 | Fukuda | H04N 5/349 |
| 2006/0061845 A1* | 3/2006 | Lin | H04N 1/4072 |
| | | | 358/540 |
| 2010/0033677 A1* | 2/2010 | Jelinek | G06K 9/00604 |
| | | | 351/208 |
| 2012/0086829 A1* | 4/2012 | Hohjoh | H04N 5/772 |
| | | | 348/223.1 |
| 2013/0308036 A1* | 11/2013 | Peng | H04N 5/23212 |
| | | | 348/345 |
| 2013/0329088 A1* | 12/2013 | Blayvas | H04N 5/23212 |
| | | | 348/239 |
| 2013/0329106 A1* | 12/2013 | Bigioi | G03B 3/10 |
| | | | 348/308 |
| 2014/0333819 A1* | 11/2014 | Aoki | G03B 13/06 |
| | | | 348/333.09 |
| 2014/0368724 A1* | 12/2014 | Zhang | H04N 5/2257 |
| | | | 348/345 |
| 2015/0163396 A1* | 6/2015 | Kudo | H04N 5/23212 |
| | | | 348/239 |
| 2015/0326772 A1* | 11/2015 | Kazami | H04N 5/2352 |
| | | | 348/252 |
| 2016/0014354 A1* | 1/2016 | Fukuda | H04N 5/349 |
| | | | 348/273 |

* cited by examiner

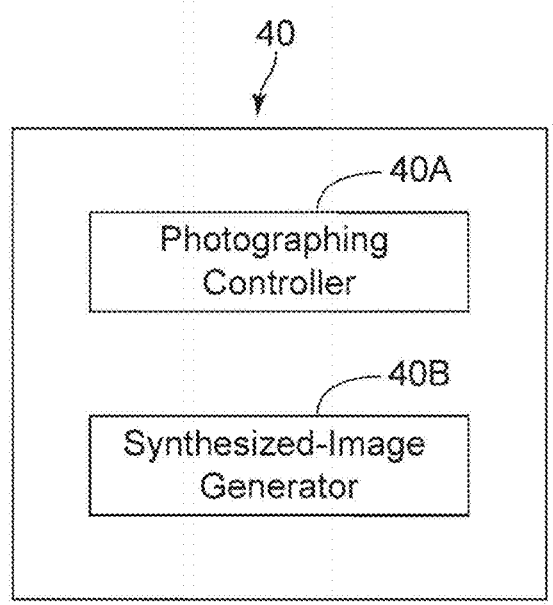

Fig. 5A

| R | Gr | R | Gr |
|---|----|---|----|
| Gb | B | Gb | B |
| R | Gr | R | Gr |
| Gb | B | Gb | B |

Fig. 5B

| R | Gr | R | Gr |
|---|----|---|----|
| Gb | B | Gb | B |
| R | Gr | R | Gr |
| Gb | B | Gb | B |

Fig. 5C

| R | Gr | R | Gr |
|---|----|---|----|
| Gb | B | Gb | B |
| R | Gr | R | Gr |
| Gb | B | Gb | B |

Fig. 5D

| R | Gr | R | Gr |
|---|----|---|----|
| Gb | B | Gb | B |
| R | Gr | R | Gr |
| Gb | B | Gb | B |

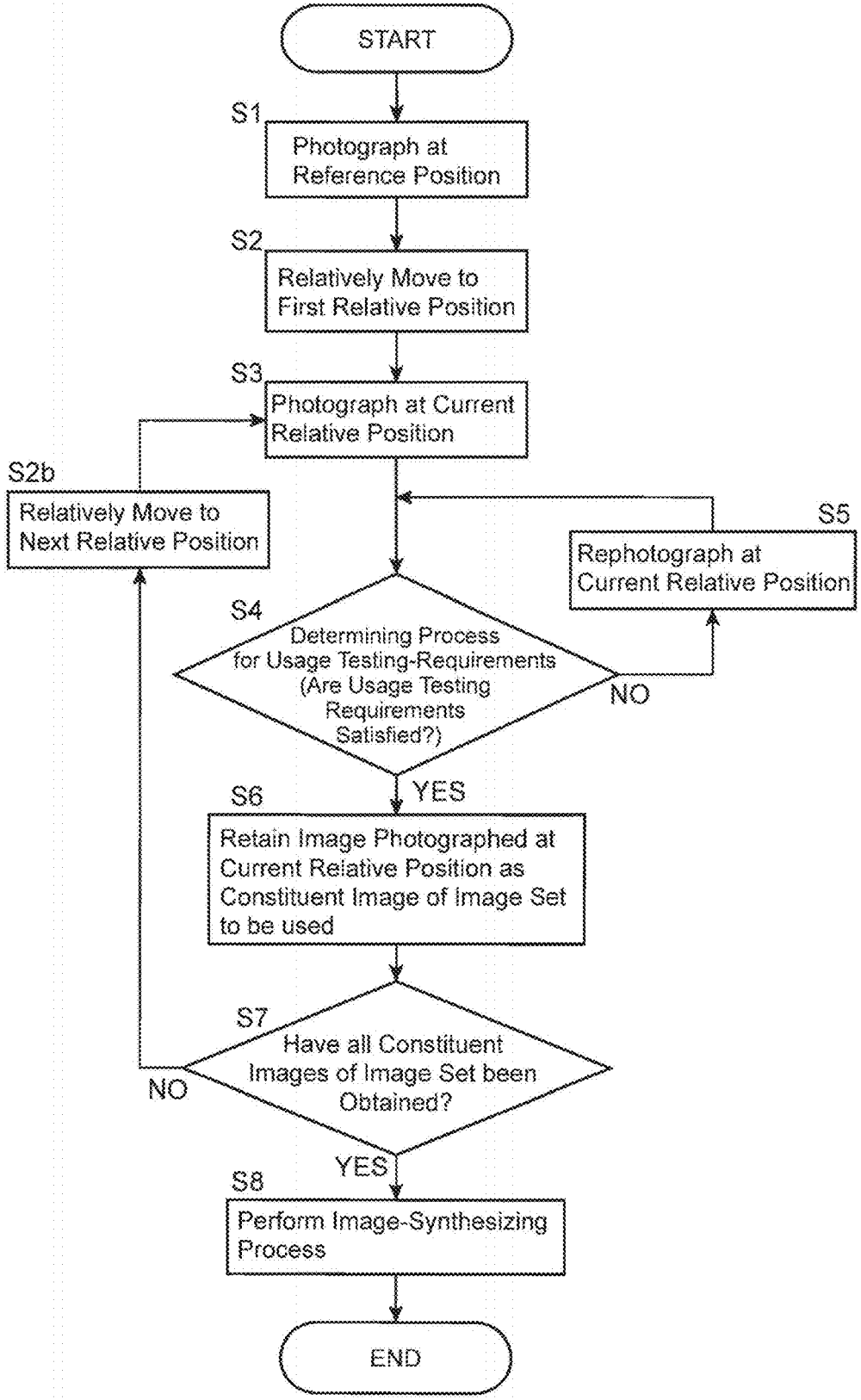

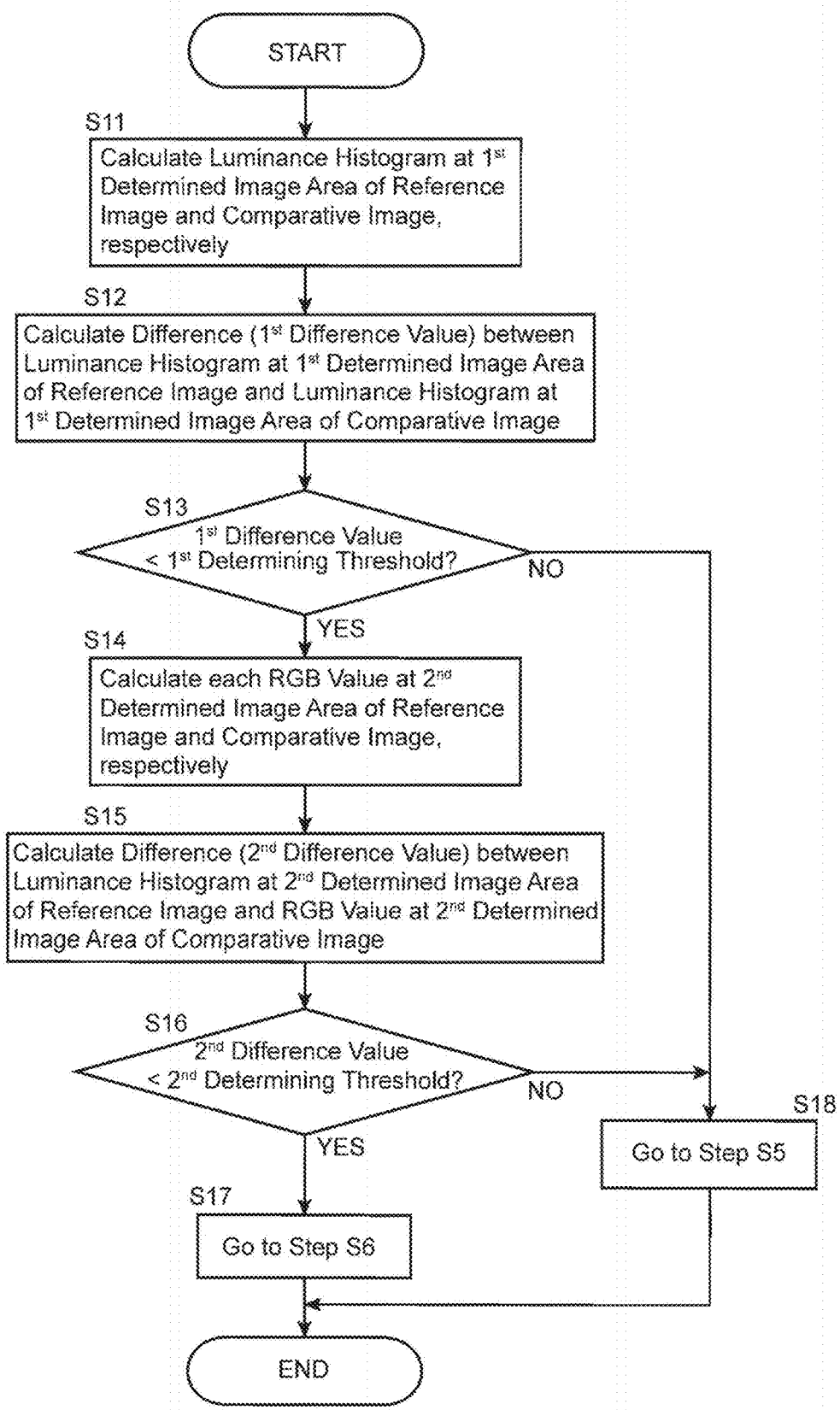

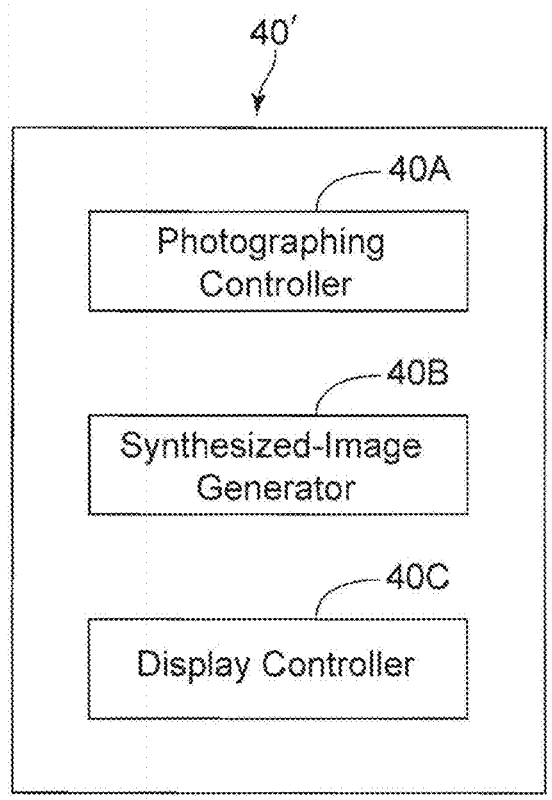

Translucent Image (1)

Translucent Images (1+2)

Translucent Images (1+2+3)

Translucent Images (1+2+3+4)

PHOTOGRAPHING APPARATUS, PHOTOGRAPHING CONTROLLER, PHOTOGRAPHING CONTROL METHOD, AND PHOTOGRAPHING CONTROL PROGRAM

BACKGROUND OF THE INVENTION

1. Field of the Invention

The present invention relates to a photographing apparatus, a photographing controller, a photographing control method, and a photographing control program.

2. Description of Related Art

In the related art, photographing apparatuses configured to photograph (capture) a plurality of images for use in image synthesis have been proposed. For example, in an image-inputting apparatus (i.e., a photographing apparatus, such as a digital camera) disclosed in Japanese Unexamined Patent Publication No. H08-265522, a plurality of images are photographed, for use in image synthesis, by capturing images while shifting the position of the optical axis relative to the image sensor in the horizontal and vertical directions. Specifically, image signals for four images, i.e., an image at the origin, an image horizontally shifted by a ½ pixel, an image vertically shifted by a ½ pixel, and an image that is both horizontally and vertical by a ½ pixel, which are shifted by a lens controller via an optical-axis shift controller, are stored in a memory, in that order. Thereafter, upon the storing of the image signals for the four images into the memory being completed, a lens unit returns to the origin in accordance with a control of the lens controller. Subsequently, the image signal at the origin position is sent back to an arithmetic circuit. The arithmetic circuit, carries out a difference evaluation between the image signal at the reentered origin and the image signal at the origin stored in the memory in accordance with a predetermined evaluation function, the evaluation result is output to an invalidation determination circuit. The invalidation determination circuit, compares the sun of the absolute values that constitute the entered evaluation result with a predetermined threshold value; if the sum of the absolute values is greater than the predetermined threshold value, the high-resolution still image signals, configured of the stored image signals of the four images, are determined as invalid, and the main controller is alerted accordingly. Upon the main controller receiving an alert that the high-resolution still image signals are invalid from the invalidation determination circuit, the main controller externally alerts that the stored high-resolution still images are invalid, and a control operation for reentering the high-resolution still images is carried out.

However, in the image-inputting apparatus of the above-mentioned Japanese Unexamined Patent Publication No. H08-265522, since the invalidation determination is carried out by using the image at the origin when the lens unit is initially positioned at the origin and the image at the origin when the lens unit has returned to the origin upon shifting per pixel unit, in the case where the invalidation determination circuit determines that the high-resolution still image signals are "invalid", five images are photographed again. Namely, since a "retry process" is performed as one set of "five photographed images", there is a possibility of an undesirably increased number of photographs being required until a high-resolution synthesized image can be obtained. Therefore, the amount of calculations performed in the image-inputting apparatus increases, and a photographic opportunity may be missed.

Furthermore, if the "photographing conditions" in the images (i.e., pixel-shifted images) other than those at the origin change (due to, e.g., an object being photographed moving, vibration being applied to the camera, an obstacle occurring, or a change in the light intensity (flickering), etc.), the image-inputting apparatus of the above-mentioned Japanese Unexamined Patent Publication No. H08-265522 does not determine the high-resolution still image signals as "invalid" (the determination does not take into consideration whether the change in the photographing conditions is "invalid"), thereby resulting in the possibility of the image quality of the synthesized image being deteriorated.

SUMMARY OF THE INVENTION

The present invention has been devised in view of the above-described problems, and provides a photographing apparatus, a photographing controller, a photographing control method, and a photographing control program which can generate a high-quality synthesized image while suppressing, as much as possible, the number of photograph images that are taken.

According to an aspect of the present invention, a photographing apparatus is provided, including an image sensor configured to convert an object image formed by a photographing optical system, of the photographing apparatus, into electrical pixel signals, the photographing optical system including an optical element; and a photographing controller configured to control a photographing operation, in which a set of images, configured of a plurality of captured images, for use in an image-synthesizing operation are photographed. During the photographing operation, the image sensor and the optical element are sequentially moved relative to each other from a reference position to a plurality of different relative positions in a direction that is different to a direction of the optical axis, wherein every time the photographing controller obtains a photographed image at each relative position, the photographing controller determines whether or not the photographed image satisfies usage testing-requirements for a constituent image of the set of images.

At each relative position, the imaging controller can repeatedly rephotograph until the obtained photographed image satisfies the usage testing-requirements, and upon the usage testing-requirements being satisfied, the obtained photographed image that satisfies the usage testing-requirements is retained as a constituent image of the set of images, and the image sensor and the optical element are relatively moved to a subsequent relative position.

It is desirable for the photographing controller to designate a photographed image obtained at the reference position, or the photographed image obtained at a relative position immediately before a current relative position out of the plurality of different relative positions, as a reference image and to designate a photographed image obtained at the current relative position as a comparative image. The photographing controller determines whether or not the photographed image obtained at the current relative position satisfies the usage testing-requirements based on the amount of difference between values of usage testing determination parameters of the reference image and values of usage testing determination parameters of the comparative image.

It is desirable for each of the usage testing determination parameters of the reference image and the usage testing determination parameters of the comparative image to include a luminance histogram of a determining image-area, wherein the photographing controller determines that the usage testing-requirements are not satisfied in the case where a difference between the luminance histogram at the determining image-area of the reference image and the luminance histogram at the determining image-area of the comparative image is greater than or equal to a determining threshold value.

It is desirable for each of the usage testing determination parameters of the reference image and the usage testing determination parameters of the comparative image to include an RGB value of a determining image-area, wherein the photographing controller determines that the usage testing-requirements are not satisfied in the case where a difference between the RGB value at the determining image-area of the reference image and the RGB value at the determining image-area of the comparative image is greater than or equal to a determining threshold value.

It is desirable for each of the usage testing determination parameters of the reference image and the usage testing determination parameters of the comparative image to include a luminance histogram of a first determining image-area and an RGB value of a second determining image-area. The photographing controller determines that the usage testing-requirements are satisfied in the case where a first difference value between the luminance histogram at the first determining image-area of the reference image and the luminance histogram at the first determining image-area of the comparative image is less than a first determining threshold value, and a second difference value between the RGB value at the second determining image-area of the reference image and the RGB value at the second determining image-area of the comparative image is less than a second determining threshold value. The photographing controller determines that the usage testing-requirements are not satisfied in the case where at least one of the first difference value is greater than or equal to the first determining threshold value and the second difference value is greater than or equal to the second determining threshold value.

It is desirable for the photographing controller to calculate a difference between values of usage testing determination parameters of the reference image and values of usage testing determination parameters of the comparative image for each of a plurality of image-areas, wherein the photographing controller designates a photographed image obtained at the reference position, or the photographed image obtained at a relative position immediately before a current relative position out of the plurality of different relative positions, as a reference image and designates a photographed image obtained at the current relative position as a comparative image. The photographing controller calculates a sum total area of the determining image-areas, to which the calculated the difference is greater than or equal to a third determining threshold value, relative to an entire image area of the comparative image. If the calculated the ratio is less than a fourth determining threshold value, the photographing controller determines that the usage testing-requirements have been satisfied. If the calculated the ratio is greater than or equal to the fourth determining threshold value, the photographing controller determines that the usage testing-requirements have not been satisfied.

The photographing apparatus can also include an image processor configured to generate a synthesized image using the image set, which is obtained at a stage where all constituent images that configure the image set have been obtained by the photographing controller. In the case where the usage testing-requirements are satisfied, the image processor replaces an image of a partial-image area, of the synthesized image that corresponds to the determining image-area to which the calculated difference is greater than or equal to the third determining threshold value, with a corresponding partial-image area of the reference image.

In an embodiment, a photographing controller is provided, configured to control a photographing operation, in which a set of images, configured of a plurality of captured images, for use in an image-synthesizing operation are photographed, wherein, during the photographing operation, the image sensor and the optical element are sequentially moved relative to each other from a reference position to a plurality of different relative positions in a direction that is different to a direction of the optical axis. The photographing controller includes a photographing controller configured to determine, every time the photographing controller obtains a photographed image at each relative position, whether or not the photographed image satisfies usage testing-requirements for a constituent image of the set of images.

In an embodiment, a photographing control method is provided, including controlling a photographing operation, in which a set of images, configured of a plurality of captured images, for use in an image-synthesizing operation are photographed, wherein, during the photographing operation, the image sensor and the optical element are sequentially moved relative to each other from a reference position to a plurality of different relative positions in a direction that is different to a direction of the optical axis; and determining, every time the photographing controller obtains a photographed image at each relative position, whether or not the photographed image satisfies usage testing-requirements for a constituent image of the set of images.

In an embodiment, a photographing control program is provided, to be implemented by a photographing controller of a photographing apparatus during a photographing operation, in which a set of images, configured of a plurality of captured images, for use in an image-synthesizing operation are photographed. During the photographing operation, the image sensor and the optical element: are sequentially moved relative to each other from a reference position to a plurality of different relative positions in a direction that is different to a direction of the optical axis. The photographing control program implements a process that determines, every time the photographing controller obtains a photographed image at each relative position, whether or not the photographed image satisfies usage testing-requirements for a constituent image of the set of images.

According to the present invention, a photographing apparatus, a photographing controller, a photographing control method, and a photographing control program are achieved, which can generate a high-quality synthesized image while suppressing, as much as possible, the number of photograph images that are taken.

The present disclosure relates to subject matter contained in Japanese Patent Application No. 2015-118809 (filed on Jun. 12, 2015) which is expressly incorporated herein in its entirety.

BRIEF DESCRIPTION OF THE DRAWINGS

The present invention will be discussed below in detail with reference to the accompanying drawings, in which:

FIG. 4 is a functional block diagram indicating an internal configuration of a DSP (controller) of a first embodiment;

FIGS. 5A, 5B, 5C and 5D are conceptual diagrams of an example of a "PSR photographing mode" of the illustrated embodiment;

FIG. 6 is a flowchart showing a process performed by the digital camera of the first embodiment;

FIG. 7 is a flowchart showing a determining process for usage testing-requirements that is performed in the flowchart of FIG. 6;

FIG. 8 is a functional block diagram indicating an internal configuration of a DSP (controller) of a third embodiment;

DESCRIPTION OF THE EMBODIMENTS

A detailed explanation of embodiments of a photographing apparatus, a photographing controller, a photographing control method, and a photographing control program will be herein discussed with reference to the drawings. However, the present invention is not limited to the following disclosed embodiments of the photographing apparatus, the photographing controller, the photographing control method, and the photographing control program. In the embodiments, components sharing the same function are indicated with common designators, and duplicate explanations thereof have been omitted.

Embodiment 1

[Example Configuration of Photographing Apparatus]

Figure 1:
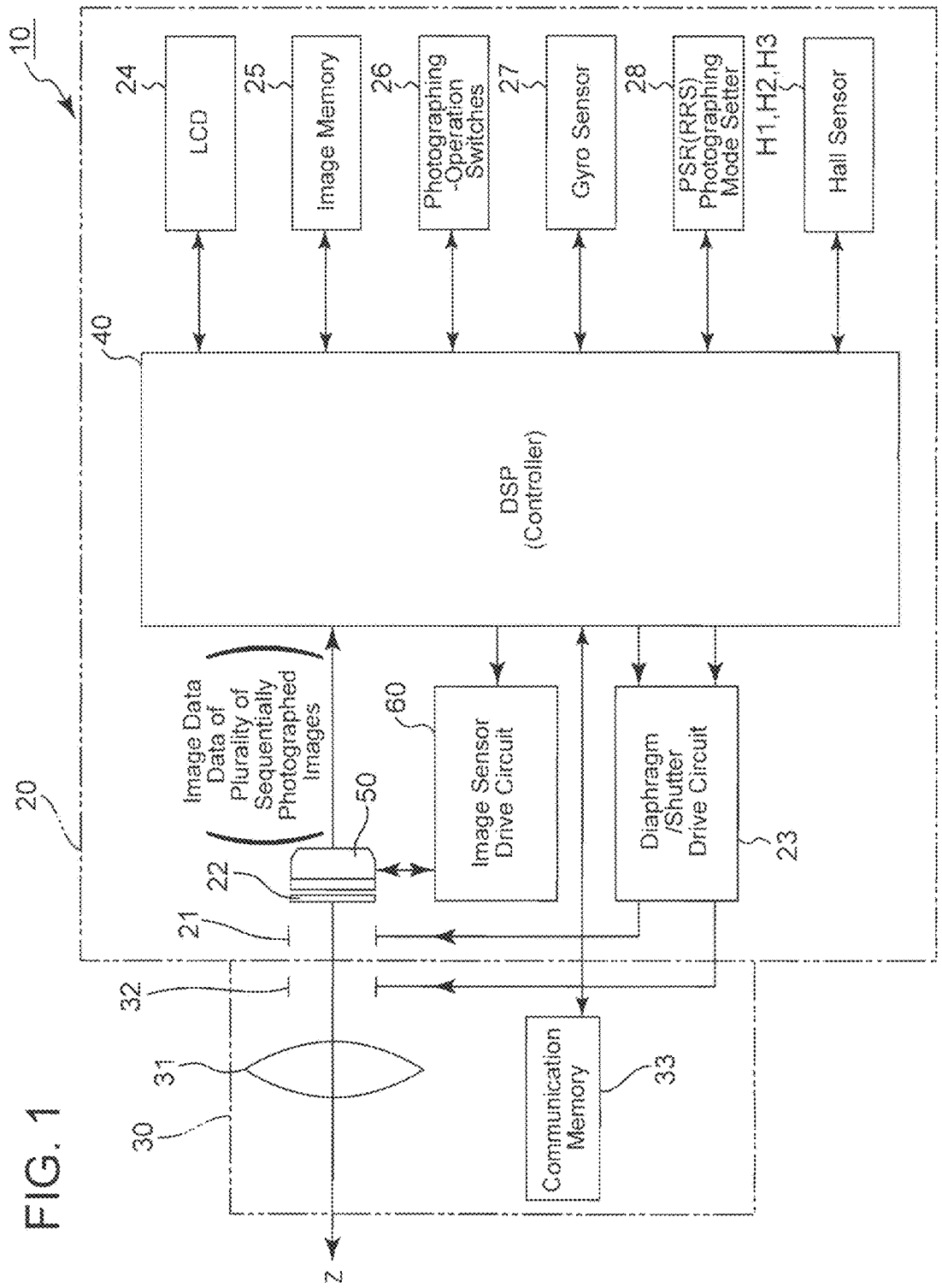
FIG. 1 is a block diagram indicating the main components of a digital camera (photographing apparatus) of a first embodiment according to the first embodiment.
Figure 2:
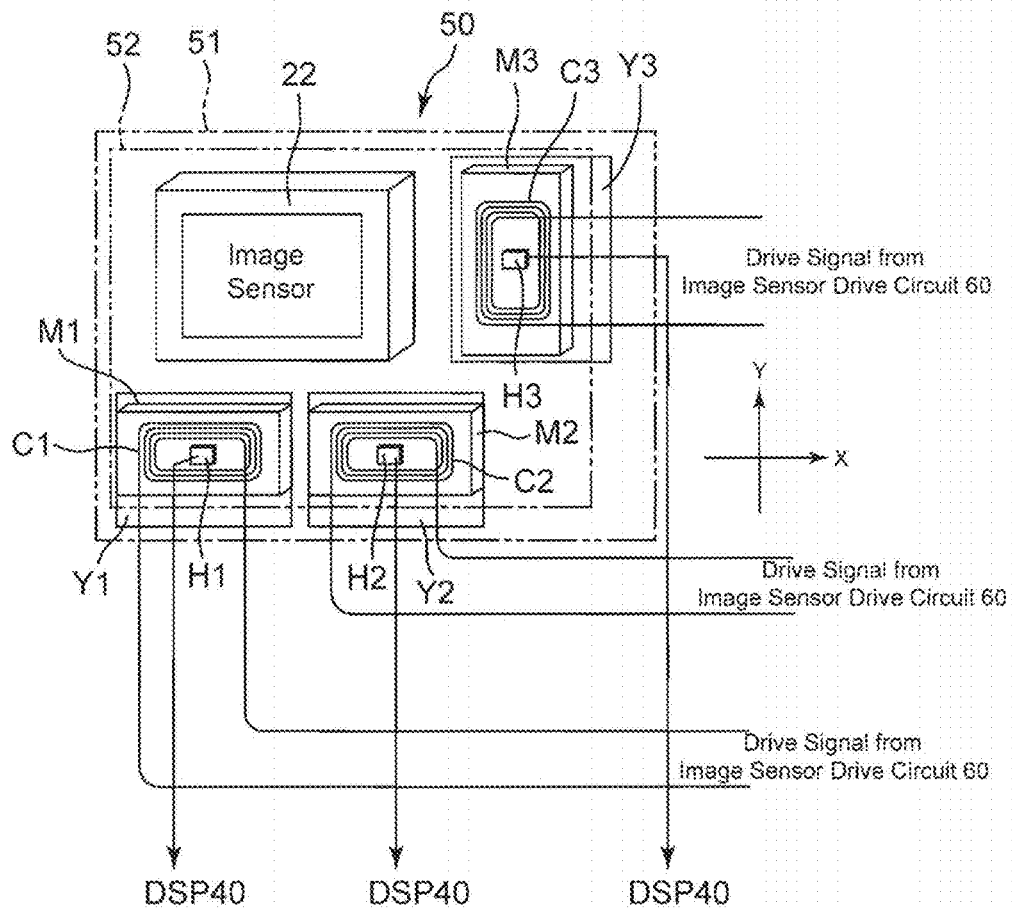
FIG. 2 is a block diagram indicating the main components of an image-shake correction device.
Figure 3:
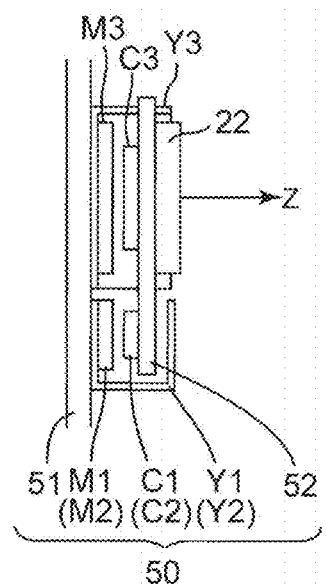
FIG. 3 is a side elevational view showing an arrangement of the image-shake correction device.

FIG. 1 is a block diagram indicating the main components of a digital camera (photographing apparatus) 10 of a first embodiment according to the present invention. FIG. 2 is a block diagram indicating the main components of an image-shake correction device. FIG. 3 is a side elevational view showing an arrangement of the image-shake correction device.

As shown in FIG. 1, the digital camera 10 is provided with a camera body 20, and a photographing lens 30 (an interchangeable photographing lens) which is detachably attached to the camera body 20. The photographing lens 30 is provided with a photographing lens group (part of a photographing optical system/movable member/image-shake correction member) 31, and a diaphragm (part of the photographing optical system) 32, in that order from the object side (left side of FIG. 1) to the image side (right side of FIG. 1). The camera body 20 is provided with a shutter (part of the photographing optical system) 21, and an image sensor (movable member/image-shake correction member) 22, in that order from the object side (left side of FIG. 1) to the image side (right side of FIG. 1). Furthermore, the camera body 20 is provided with a diaphragm/shutter drive circuit 23 which controls the driving of the diaphragm 32 and the shutter 21 when the photographing lens 30 is attached to the camera body 20. An object image, which is formed by object-emanating light rays that are incident on the photographing lens group 31 and pass through the diaphragm 32 and the shutter 21, is formed on a light-receiving surface of the image sensor 22. The object image which is formed on the light-receiving surface of the image sensor 22 is electrically converted into pixel signals via a large number of pixels, arranged in a matrix, having different detection colors, and is output as image data (plurality of sequentially photographed image data) to a DSP (Digital Signal Processor/controller/processor) 40. The DSP 40 performs predetermined image processing on image data that has been input therein from the image sensor 22; and this processed image data is displayed on an LCD (display) 24 and is stored in an image memory 25. Furthermore, although the photographing lens group 31 is indicated in FIG. 1 as a single lens element, in practice the photographing lens group 31 includes a plurality of lens elements such as, e.g., a fixed lens element(s), lens elements of a zoom lens system which move during zooming, and/or a focusing lens element(s) which moves during focusing, etc.

Although not shown in the drawings, the image sensor 22 is configured of a plurality of components, such as a package, a solid-state imaging device chip accommodated in the package, and a lid member fixed onto the package in order to protect the solid-state imaging device chip in an air-tight manner. In the present disclosure, "driving the image sensor 22" refers to "driving at least a part of the plurality of components of the image sensor 22 through which the object-emanating light rays pass".

The photographing lens 30 is provided with a communication memory 33 which stores various information, such as resolution (MTF) information of the photographing lens group 31 and the aperture diameter (aperture value) of the diaphragm 32, etc. Upon the photographing lens 30 being attached to the camera body 20, various information stored in the communication memory 33 is read into the DSP 40.

The camera body 20 is provided with photographing-operation switches 26 which are connected to the DSP 40. The photographing-operation switches 26 include various switches, such as a power-ON switch and a shutter-release switch, etc.

The camera body 20 is further provided with a gyro sensor (shake detector) 27 which is connected to the DSP 40. The gyro sensor 27 detects shake detection signals that indicate shaking in a plane that is orthogonal to the optical axis (the optical axis that is defined by the photographing lens group 31) within the camera body 20 by detecting the angular velocity of the movement that is applied to the camera body 20 (about an x-axis and a y-axis).

As shown in FIGS. 1 through 3, the image sensor 22 is mounted onto an image-shake correction device (image stabilizer) 50 so that the image sensor 22 is movable in an x-direction and a y-direction (two orthogonal directions) which are orthogonal to an optical axis Z of the photographing optical system (photographing lens group 31). The image-shake correction device 50 is provided with a mount support plate 51 which is mounted onto a structural member such as a chassis, etc., of the camera body 20; a movable stage 52, onto which the image sensor 22 is mounted, which is slidable relative to the mount support plate 51; magnets M1, M2 and M3 mounted onto the mount support plate 51 on the side thereof that faces the movable stage 52; yokes Y1, Y2 and Y3 which are made of a magnetic material and are mounted onto the mount support plate 51 to face the magnets M1, M2 and M3 with the movable stage 52 positioned between the magnets M1, M2 and M3 and the yokes Y1, Y2 and Y3, thereby forming a magnetic circuit between the yokes Y1, Y2 and Y3 and the magnets M1, M2 and M3, respectively; and drive coils C1, C2 and C3, mounted onto the movable stage 52, which each generate a driving force by receiving an electric current within the magnetic field of the magnetic circuit. The movable stage 52 (image sensor 22) is driven (moved) relative to the mount support plate 51 within a plane that is orthogonal to the optical axis by supplying (applying) alternating drive signals (alternating current) to the drive coils C1, C2 and C3. The alternating drive signals that are supplied to the drive coils C1, C2 and C3 are controlled by the DSP 40 and are generated by an image sensor drive circuit 60.

In the illustrated embodiment, a magnetic driver configured of the magnet M1, the yoke Y1 and the drive coil C1, and a magnetic driver configured of the magnet M2, the yoke Y2 and the drive coil C2 (two magnetic drivers) are arranged along a long-side direction (horizontal direction/x-direction) of the image sensor 22 at a predetermined distance therebetween; and a magnetic driver configured of the magnet M3, the yoke Y3 and the drive coil C3 (one magnetic driver) is arranged along a short-side direction of the image sensor 22 orthogonal to the long-side direction thereof (vertical direction/y-direction).

The mount support plate 51 is further provided with Hall sensors (position detectors) H1, H2 and H3 arranged in the close vicinity of the drive coils C1, C2 and C3, respectively (within the central spaces thereof). The Hall sensors H1, H2 and H3 detect the magnetic force of the magnets M1, M2 and M3 and output (detect) Hall output signals (position detection signals), which indicate the position of the movable stage 52 (image sensor 22) in a plane that is orthogonal to the optical axis Z. The y-directional position and inclination (rotation) of the movable stage 52 (image sensor 22) are detected by the Hall sensors H1 and H2, and the x-directional position of the movable stage 52 (image sensor 22) is detected by the Hall sensor H3. The DSP 40 controls, via the image sensor drive circuit 60, the driving of the image-shake correction device 50, which moves the image sensor 22 within a plane orthogonal to the optical axis Z, based on shake detection signals detected by the gyro sensor 27 that indicate hand shake/vibrations applied to the camera body 20 in a plane orthogonal to the optical axis Z, and the Hall output signals that indicate the position of the image sensor 22 within a plane orthogonal to the optical axis Z output by the Hail sensors H1, H2 and H3. Accordingly, the imaging position of the object image on the image sensor 22 can be displaced to correct image shake that is caused by hand shake/vibration, etc.

The digital camera 10 of the illustrated embodiment is provided with a photographing mode (multi-shot mode) which sequentially takes a plurality of pictures (images) while utilizing the image-shake correction device 50 to minutely move the image sensor 22 in a plane that is orthogonal to the optical axis Z of the photographing optical system (photographing lens group 31), and synthesizes these images into a single picture (synthesized not by simple addition of the images, but by synthesizing using specific arithmetic operations via image processing of data), thereby generating an ultra-high definition (high picture quality and high precision) image; hereinafter, this photographing mode will be referred to as a "PSR (Pixel Shift Resolution) photographing mode" (Pixel Shift Resolution is also known as "RRS (Real Resolution System)". As shown in FIG. 1, the camera body 20 is provided with a PSR photographing mode setter 28, connected to the DSP 40, for determining whether or not to carry out a "PSR photographing mode", and also for performing detailed settings.

Unlike a conventional Bayer method that obtains one piece of color information per one pixel, the "PSR photographing mode (multi-shot mode)" obtains information of each RGB color for each pixel, thereby enabling an extremely high definition image to be created that has superior detail and color reproduction. Furthermore, an effect can be obtained in which noise can be reduced without the occurrence of moiré or false color.

FIG. 4 is a functional block diagram indicating an internal configuration of a DSP (controller) 40, according to the first embodiment. In FIG. 4, the DSP (controller) 40 includes an photographing controller 40A and synthesized-image generator (image processor) 40B.

The photographing controller 40A controls a "photographing process" in which a "set of images", configured of a plurality of captured images for use in multi-shot image synthesis, are captured. In this "photographing process", one of the image sensor 22 and an optical element provided in the photographing optical system (e.g., at least part of the photographing lens group 31) moves relative to the other of the image sensor 22 and the optical element provided in the photographing optical system, in a sequential order, to respectively plurality of different "relative positions" in a direction that is different to a direction of the optical axis (e.g., in directions that are orthogonal to the optical axis) from a "reference position" of the one of the image sensor 22 and the optical element provided in the photographing optical system (e.g., at least part of the photographing lens group 31) relative to the other of the image sensor 22 and the optical element provided in the photographing optical system. The term "optical element" used herein can refer to a lens group (or lens element), a prism or a mirror.

FIGS. 5A through 5D are conceptual diagrams of an example of a "PSR photographing mode (multi-shot mode)" of the illustrated embodiment. In each of FIGS. 5A through 5D, the image sensor 22 is provided with a large number of pixels arranged at a predetermined pixel pitch as a matrix on the light-receiving surface of the image sensor 22, and one of Bayer array color filters B, G (Gr, Gb) and B is provided in front surface of each pixel. In particular, the Bayer array color filters, one B pixel, two G pixels and one B pixel are included as a "basic unit". The pixels detect the color of the object-emanating light rays that are incident thereon, i.e., photoelectrically convert the light of the color components (color band), via the respective color filters B, G (Gr, Gb) and B (which are provided on the front surface of the pixels) and each pixel stores an electrical charge in accordance with the strength (luminance) of the light rays. More specifically, an image is photographed at the reference position shown in FIG. 5A; another image is photographed at the position shown at FIG. 5B, at which the image sensor 22 has been moved (relatively shifted) downward by a pitch of one pixel; another image is photographed at the position shown at FIG. 5C, at which the image sensor 22 has been further moved rightward by a pitch of one pixel; another image is photographed at the position shown at FIG. 5D, at which the image sensor 22 has been further moved upward by a pitch of one pixel; and thereafter the image sensor 22 returns to the reference position shown in FIG. 5A. In other words, in the present specification, e.g., the position which is indicated in FIG. 5A is referred to as the "reference position", and the positions which are indicated in FIGS. 5B through 5D are referred to as "relative positions". Furthermore, the "reference position" and the plurality of "relative positions" respectively correspond to the four pixels of the abovementioned "basic unit" (i.e., one R pixel, two G pixels and one B pixel). Hence, four images (raw image data/raw format data) that are sequentially photographed by driving the image sensor 22, in a square movement path at a pitch of one pixel in a plane that is orthogonal to the optical axis, are input into the DSP 40 as an "image set to be used".

Furthermore, every time the photographing controller 40A obtains a photographed image from the image sensor 22 at each relative position, it is determined whether or not the obtained image satisfies "usage testing-requirements" for a constituent image of the "image set to be used". A detailed explanation of the "usage testing-requirements" will be given hereinafter.

Furthermore, at each relative position, the photographing controller 40A repeatedly "rephotographs" until the captured image satisfies the usage testing-requirements. When the usage testing-requirements are satisfied, the obtained image that satisfies the usage testing-requirements is retained (temporarily stored in a memory (not shown)) as a constituent image of the set of images to be used, and the image sensor 22 and the aforementioned optical element are relatively moved to the next (subsequent) relative position. Note that if the number of times the "rephotographing" has been repeated reaches a predetermined number, the subroutine of the multi-shot synthesizing process that is currently being implemented can be halted and control is automatically returned to the beginning of this subroutine to be implemented again, or a display requesting the user to decide whether or not implement this subroutine again can be displayed on the LCD 24. In other words, it is possible to arbitrarily set an upper limit of the number of times by which the "rephotographing" is allowed to be repeated.

For example, the photographing controller 40A designates the image obtained at the reference position, or the image obtained at a relative position immediately before the current relative position out of the plurality of relative positions, as a "reference image" and the image obtained at the current relative position is designated as a "comparative image". Namely, for example, in the case where the current position is at the relative position shown in FIG. 5C, the image obtained at the reference position shown in FIG. 5A or the image obtained at the relative position shown in FIG. 5B is designated as the "reference image", and the image obtained at the relative position shown in FIG. 5C is designated as the "comparative image". Furthermore, the photographing controller 40A determines whether the image obtained at the current relative position satisfies the usage testing-requirements based on the amount (level) of difference between the values of "usage testing determination parameters" of the reference image and the values of "usage testing determination parameters" of the comparative image. The "usage testing determination parameters" can include, e.g., at least one of a luminance histogram at a determining image-area and RGB values at the determining image-area.

The synthesized-image generator 40B generates a synthesized image using the image set (to be used), which are obtained at the stage where all the constituent images that configure the image set (to be used) are obtained by the imaging controller 40A.

The above-mentioned "usage testing-requirements" can refer to, e.g., satisfying both a "first difference value" of a luminance histogram at a determining image-area (herein referred to as the "first determining image-area") of the reference image and a luminance histogram at the first determining image-area of the comparative image being less than a "first determining threshold value", and a "second difference value" of RGB values at a determining image-area (herein referred to as the "second determining image-area") of the reference image and RGB values at the second determining image-area of the comparative image being less than a "second determining threshold value". In other words, in the case where at least one of the "first difference value" being greater than or equal to the "first determining threshold value" and the "second difference value" being greater than or equal to the "second determining threshold value" is satisfied, the photographing controller 40A determines that the usage testing-requirements are not satisfied. The "first determining image-area" and the "second determining image-area" are each units of area used for comparing the reference image with the comparative image, and can refer to "one pixel" between the reference image and the comparative image, or can refer to a "pixel block" configured of a plurality of pixels.

[Example Operation of Photographing Apparatus]

The following is a description of an example of a process performed by the digital camera (photographing apparatus) 10, which is provided with the above-described configuration. FIG. 6 is a flowchart of the process performed by the digital camera 10 of the first embodiment. FIG. 7 is a flowchart showing a determining process utilizing the usage testing-requirements, performed in the flowchart shown in FIG. 6. The operations shown in the flowcharts of FIGS. 6 and 7 indicate a processes performed in the DSP 40 in particular; these processes are performed by the DSP 40 reading out a control program stored in a memory (not shown).

At step S1, the DSP 40 of the digital camera 10 takes a photograph (via the photographing optical system and the image sensor 22 in particular) at the "reference position" (e.g., at the position shown in FIG. 5A). Thereupon, the DSP 40 obtains the image photographed at the "reference position".

At step S2, the DSP 40 relatively shifts the image sensor 22 and the aforementioned optical element (e.g., at least part of the photographing lens group 31) to the first relative position (next position; e.g., the position shown in FIG. 5B).

At step S3, the DSP 40 of the digital camera 10 takes a photograph (via the photographing optical system and the image sensor 22 in particular) at the current relative position (e.g., at the position shown in FIG. 5B). Thereupon, the DSP 40 obtains the image that was photographed at the current relative position (e.g., at the position shown in FIG. 5B).

At step S4, the DSP 40 carries out the determining process utilizing the usage testing-requirements, in other words, a determining process is carried out to determine whether or not the usage testing-requirements are satisfied. If the usage testing-requirements are not satisfied (step S4: NO), at step S5 the DSP 40 of the digital camera 10 "rephotographs" (via the photographing optical system and the image sensor 22 in particular) at the Current relative position. In other words, the DSP 40 of the digital camera 10 performs a "retry process". Whereas, if the usage testing-requirements are satisfied (step S4: YES), at step S6 the DSP 40 retains the obtained image that satisfies the usage testing-requirements as a constituent image of the set of images to be used.

Hereinbelow, details of the "determining process utilizing the usage testing-requirements" will be discussed with reference to FIG. 7.

At step S11, the DSP 40 calculates a luminance histogram at the first determining image-area of the reference image and a luminance histogram at the first determining image-area of the comparative image.

At step S12, the DSP 40 calculates the difference (i.e., the aforementioned "first difference value") between the luminance histogram at the first determining image-area of the reference image and the luminance histogram at the first determining image-area of the comparative image.

At step S13, the DSP 40 determines whether or not the calculated "first difference value" is less than the "first determining threshold value".

If the "first difference value" is less than the "first determining threshold value" (step S13: YES), at step S14 the DSP 90 calculates each of an RGB value at the second determining image-area of the reference image and an RGB value at the second determining image-area of the comparative image.

At step S15, the DSP 40 calculates the difference (i.e., the aforementioned "second difference value") between the RGB value at the second determining image-area of the reference image and the RGB value at the second determining image-area of the comparative image.

At step S16, the DSP 40 determines whether or not the calculated "second difference value" is less than the "second determining threshold value".

If the calculated "second difference value" is less than the "second determining threshold value" (step S16: YES), control proceeds to step S6 shown in FIG. 6, and the DSP 40 retains the obtained image that satisfies the usage testing-requirements as a constituent image of the set of images to be used.

Whereas, if the calculated "second difference value" is greater than or equal to the "second determining threshold value" (step S16: NO), control proceeds to step S5 (via step S18) shown in FIG. 6, and the DSP 40 "rephotographs" at the current relative position. Furthermore, if the calculated "first difference value" is also greater than or equal to the "first determining threshold value" (step S13: NO), control proceeds to step S5 (via step S18) of FIG. 6, and the DSP 40 "rephotographs" at the current relative position.

Returning to the description of the flowchart in FIG. 6, at step S7, the DSP 40 determines whether or not all of the constituent images of the image set to be used have been obtained.

If all of the constituent images of the image set to be used have not yet been obtained (step S7: NO), control proceeds to step S2b, at which the image sensor 22 and the aforementioned optical member (e.g., the photographing lens group 31) shift to the next (subsequent) relative position (e.g., the position shown at FIG. 5C); thereafter control proceeds to step S3. The DSP 40 repeats the subroutine from steps S2 (S2b) through S7 (step S7: NO) until all of the constituent images of the image set to be used are obtained.

If all of the constituent images of the image set to be used are obtained (step S7: YES), the DSP 40 performs an image-synthesizing process using the obtained image set, i.e., the DSP 40 generates a synthesized image.

According to the above-described first embodiment, every time the photographing controller 40A, in the DSP 40, obtains a photographed image at each relative position, it is determined whether or not the obtained image satisfies the "usage testing-requirements" for a constituent image of the "image set to be used".

According to the configuration of the DSP 40, a "retry process", i.e., "rephotographing" can be performed for every single image that is photographed at each of the relative positions, i.e., at a unit of "one photograph". Accordingly, in comparison with the related art, in which "five photographs" are taken as one set in a retry process, the number of times a photographing operation is carried out until all of the constituent images of a set of images (to be used) are obtained can be reduced. Furthermore, since the DSP 40 determines whether or not the usage testing-requirements are satisfied for each image obtained at each relative position, all of the images that are photographed at each relative position have been subject to the determining process utilizing the usage testing-requirements. Therefore, since obtained images that do not satisfy the usage testing-requirements can be reliably (and efficiently) removed from being subject to the image-synthesizing process, deterioration in the image quality of the synthesized image can be prevented.

It should be noted that in the above description, the "usage testing-requirements" include both satisfying the "first difference value" between the luminance histogram at the first determining image-area of the reference image and the luminance histogram at the first determining image-area of the comparative image being less than the "first determining threshold value", as well as satisfying the "second difference value" between the RGB value at the second determining image-area of the reference image and the RGB value at the second determining image-area of the comparative image being less than the "second determining threshold value"; however, the present invention is not limited thereto. For example, it is possible for the "usage testing-requirements" to only consist of satisfying the "first difference value" between the luminance histogram at the first determining image-area of the reference image and the luminance histogram at the first determining image-area of the comparative image being less than the "first determining threshold value", or only consist of satisfying the "second difference value" between the RGB value at the second determining image-area of the reference image and the RGB value at the second determining image-area of the comparative image being less than the "second determining threshold value".

Embodiment 2

In a second embodiment, in the case where predetermined conditions are satisfied, the comparative image is used in image synthesis even if the difference between the values of "usage testing determination parameters" of the reference image and the values of "usage testing determination parameters" of the comparative image are greater than or equal to a determining threshold value. In other words, in the second embodiment, the "retry process" is not performed in a uniform manner whenever the difference between the values of "usage testing determination parameters" of the reference image and the values of "usage testing determination parameters" of the comparative image are greater than or equal to a determining threshold value, as in the configuration of the first embodiment. Note that since the configuration of the digital camera 10 of the second embodiment is the same as that of the first embodiment, description of the second embodiment will also refer to FIGS. 1 through 4.

In the DSP (controller) 40 of the second embodiment, the photographing controller 40A calculates the difference between the values of the usage testing determination parameters of the reference image and the values of the usage testing determination parameters of the comparative image for each of the plurality of determining image-areas.

Furthermore, the photographing controller 40A calculates a ratio of a "sum total area" of determining image-areas, to which the above-mentioned calculated difference is greater than or equal to a "third determining threshold value", relative to the entire image area of the comparative image.

Thereafter, if the above-mentioned calculated ratio is less than a "fourth determining threshold value", the photographing controller 40A determines that the usage testing-requirements have been satisfied; whereas, if the above-mentioned calculated ratio is greater than or equal to a "fourth determining threshold value", the photographing controller 40A determines that the usage testing-requirements have not been satisfied.

Note that the determining image-area(s), to which the calculated difference is greater than or equal to the "third determining threshold" corresponds to the area(s) at which the aforementioned change in "photographing conditions" has occurred. Furthermore, the above-mentioned ratio of the "sum total area" of determining image-areas relative to the entire image area of the comparative image corresponds to the ratio of the occupied area in which the change in "photographing conditions" has occurred out of the entire image area of the comparative image. Out of the entire image area of the comparative image, if the ratio of the occupied area in which the change in "photographing conditions" has occurred is large, namely, if this ratio is greater than or equal to the "fourth determining threshold", it is difficult to use such a comparative image for image synthesis (i.e., it is difficult to attain a high-quality synthesized image with such a comparative image). Whereas, if the ratio of the occupied area in which the change in "photographing conditions" has occurred is small, namely, if this ratio is less than the "fourth determining threshold", the area in which no change has occurred in "photographing conditions" out of the entire image area of the comparative image is beneficial for use in image synthesis (i.e., a high-quality synthesized image can be attained with such a comparative image). Accordingly, if the calculated ratio is less than the "fourth determining threshold", the photographing controller 40A of the second embodiment determines that the usage testing-requirements have been satisfied. However, if the change in "photographing conditions" is caused by hand-shake or flickering, the area in which the change in "photographing conditions" occurs tends to distribute (extend) over a major portion of the image area of the comparative image. Accordingly, if the change in "photographing conditions" is caused by hand-shake or flickering, there is a tendency for the above-mentioned calculated ratio to be greater than or equal to the "fourth determining threshold value". Furthermore, if the change in "photographing conditions" is caused by object-image blur or a difference in exposure, the area in which the change in "photographing conditions" occurs tends to only appear in a relatively minor portion of the image area of the comparative image. Accordingly, if the change in "photographing conditions" is caused by object-image blur or a difference in exposure, there is a tendency for the above-mentioned calculated ratio to be less than the "fourth determining threshold value".

Furthermore, if the usage testing-requirements are satisfied, the synthesized-image generator 40B replaces an image(s) of a partial-image area(s), of the synthesized image that corresponds to the determining image-area to which the calculated difference is greater than or equal to the "third determining threshold value", with a corresponding partial-image area(s) of the reference image.

As described above, according to the second embodiment, the photographing controller 40A of the DSP 40 calculates the difference between the values of the usage testing determination parameters of the reference image and the values of the usage testing determination parameters of the comparative image for each of the plurality of determining image-areas with respect to each of the plurality of determining image-areas. Thereafter, the photographing controller 40A calculates the ratio of the sum total area of the determining image-areas, to which the calculated difference is greater than or equal to the third determining threshold value, relative to the entire image area of the comparative image. Thereafter, if the calculated ratio is less than the fourth determining threshold value, the photographing controller 40A determines that the usage testing-requirements have been satisfied.

According to the above-described configuration of the DSP 40, if a change in the "photographing conditions" occurs an area of the comparative image, in the case where the ratio of the area of comparative image in which the "photographing conditions" have not change is still large, rather than performing a "retry process" in a uniform manner, this comparative image can still be used in the image-synthesizing process. Accordingly, the number of photographs that are needed in order to obtain all of the constituent images of a set of images to be used can be further reduced.

Furthermore, in the DSP 40 of the second embodiment, if the usage testing-requirements are satisfied, the photographing controller 40A replaces an image(s) of a partial-image area(s), of the synthesized image that corresponds to the determining image-area(s) to which the calculated difference is greater than or equal to the "third determining threshold value", with a corresponding partial-image area(s) of the reference image.

According to the above-described configuration of the DSP 40, since the partial area in the synthesized image that corresponds to the determining image-area(s), of the comparative image, to which the calculated difference is greater than or equal to the third determining threshold value, i.e., the area of the synthesized image that is assumed to have a poor image quality, can be replaced with an image of the corresponding partial area of the reference image, this results in prevention of deterioration in image quality of the synthesized image.

Embodiment 3

In a third embodiment, the plurality of photographing images that are respectively taken at the reference position and the plurality of relative positions are each displayed on the LCD 24 in synchronization with the "relative shift". Note that since the configuration of the digital camera of the third embodiment is the same as the digital camera 10 of the first embodiment, the description of the third embodiment will also refer to FIGS. 1 through 3.

FIG. 8 shows a functional block diagram of the internal configuration of a DSP (controller) 40' according to the third embodiment. In FIG. 8, the DSP 40' of the third embodiment is provided with a display controller 40C in addition to the photographing controller 40A and the synthesized-image generator 40B that are described in the first and second embodiments.

For example, as described in the first embodiment, every time the photographing controller 40A obtains a photographed image from the image sensor 22 at each relative position, it is determined whether or not the obtained image satisfies the "usage testing-requirements" for a constituent image of the "image set to be used". Furthermore, at each relative position, the photographing controller 40A repeatedly "rephotographs" until the captured image satisfies the usage testing-requirements. When the usage testing-requirements are satisfied, the obtained image that satisfies the usage testing-requirements is retained as a constituent image of the set of images to be used, and the image sensor 22 and the aforementioned optical element are relative moved to the next relative position.

Therefore, the number of photographs that are taken (the number of obtained images) at each relative position is unknown. Accordingly, it is very difficult for the user to recognize when the capturing of one set of images has started and ended. This problem is particularly prominent in the case where an electronic shutter, which does not involve any mechanical operations, is used in the photographing operation. Consequently, there is a possibility of the user mistakenly moving the imaging apparatus (e.g., by changing the composition, or removing the imaging apparatus (camera) from a tripod, etc.) even though one set of photographing images is currently being captured. In such a case, the quality of the synthesized image of one set of photographing images becomes significantly deteriorated, resulting in a failed attempt at obtaining a high-quality synthesized image.

In order to deal with this problem, the display controller 40C performs a "display control process". As an example of a "display control process", the display controller 40C controls a displaying of a plurality of captured images captured at the reference position and at the plurality of relative positions, respectively, onto the LCD (display) 24 in accordance with the "relative shift" (the relative movement of one of the image sensor 22 and the aforementioned optical element provided in the photographing optical system). "Accordance with the relative shift" refers to, e.g., with respect to timing, displaying the captured image captured at the first position at the timing itself of the shifting from the first position to the subsequent second position, and at a predetermined timing of the photographing process at the second position and/or of the imaging process. In other words, since it is only required to display captured image captured at the first position at a timing that has a predetermined relationship with the timing of the shifting from the first position to the subsequent second position, "accordance with the relative shift" also includes the concept of "displaying in synchronization with the relative shift". Furthermore, the display controller 40C can control the LCD 24 to display the captured images in a manner that is recognizable to the user, e.g., by displaying the number of captured images that constitute the set of images and the number of captured images that have currently already been obtained.

Figure 9A:
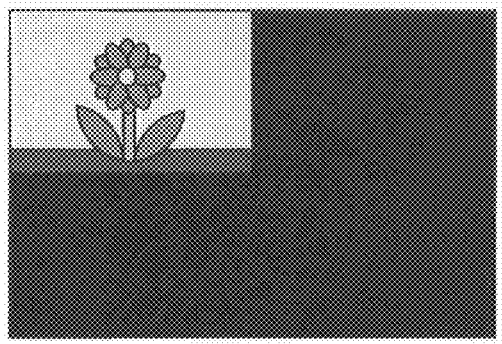
FIGS. 9A, 9B, 9C and 9D are explanatory views of display images, according to the third embodiment.
Figure 9B:
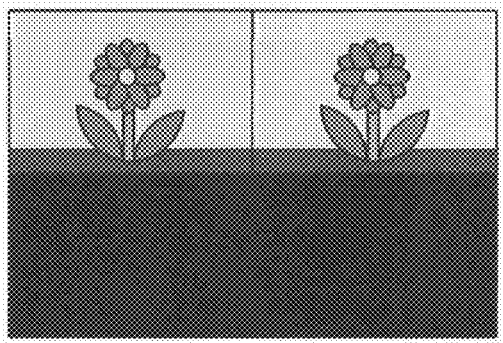
Figure 9C:
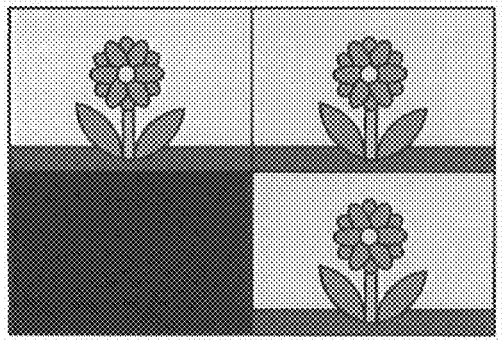
Figure 9D:
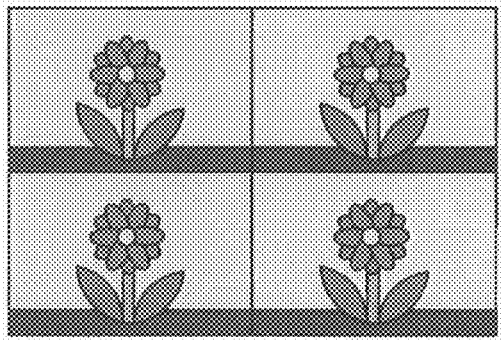

For example, the display controller 40C defines a plurality of "partial screen areas" with respect to a display screen of the LCD 24. Furthermore, the display controller 40C makes the plurality of "partial screen areas" to correspond to the reference position and the plurality of relative positions, respectively. In other words, e.g., each "partial screen area" on the display screen of the LCD 24 is compatible with the pixels, which each has the "basic unit" of the above-described color filters. Furthermore, as shown in FIG. 9A, the display controller 40C displays the plurality of captured images, obtained at the reference position and at the plurality of relative positions, in the partial screen areas, respectively, which correspond to the reference position and the plurality of relative positions. FIG. 9A shows a display image displayed on the LCD 24 indicting that a photographing operation at the reference position has completed and a photographing operation is currently being carried out at the first relative position. FIG. 9B shows a display image displayed on the LCD 24 indicating that a photographing operation at the first relative position has completed and a photographing operation is currently being carried out at the second relative position. FIG. 9C shows a display image displayed on the LCD 24 indicating that a photographing operation at the second relative position has completed and a photographing operation is currently being carried out at the third relative position. FIG. 9D shows a display image displayed on the LCD 24 indicating that a photographing operation at the third relative position has completed and an image-synthesizing operation is currently being carried out.

Specifically, the display controller 40C of the first embodiment sequentially displays the four capture images, obtained at the reference position and the three relative positions, in the same pattern (display pattern) as a "relative shift pattern" that is controlled by the photographing controller 40A. In other words, the display image sequentially changes by each still image that is captured at each position being sequentially added to the display in accordance with the shifting (movement) of one of the image sensor 22 and the aforementioned optical element (e.g., the photographing lens group 31). For example, if the "relative shift pattern" shown in FIGS. 5A through 5D shifts in a clockwise direction, the display controller 40C sequentially displays the four captured images obtained at the reference position and the three relative positions in a clockwise manner, with respect to the four partial screen areas, into which the display screen of the LCD 24 is divided. The above-described "display pattern" is not limited thereto, and can be a pattern, e.g., that matches the shifting direction of the image sensor 22 and sequentially displays the four captured images obtained at the reference position and the first through third relative positions in an anti-clockwise manner. Alternatively, the "display pattern" can be a pattern which sequentially displays the four captured images, obtained at the reference position and the first through third relative positions, so that the path of the display positions plots a "Z" pattern. Alternatively, the "display pattern" can be a pattern such that the four captured images obtained at the reference position and the first through third relative positions with respect to the four partial screen areas (which constitutes the display screen of the LCD 24 vertically and horizontally divided into four sections) are sequentially displayed, e.g., from the top (bottom) or from the right (left).

In the case where the "rephotographing" is performed a plurality of times at a relative position, the display controller 40C sequentially updates the photographed image displayed at the partial image-area that corresponds to this relative position with the rephotographed image. Accordingly, the user can recognize which relative position at which a "rephotographing" operation has been repeated. In other words, the user can accurately recognize the progress of the photographing operation in the multi-shot mode. Furthermore, before "rephotographing" at a relative position before step S5 in FIG. 6), the user can be alerted that the "usage testing-requirements" were not satisfied and thereafter the "rephotographing" operation can be performed. Alternatively, before the "rephotographing" operation is performed at a relative position (i.e., before step S5 in FIG. 6), a message such as "the testing-requirements for usage were not satisfied. Do you wish to rephotograph?" can be displayed on the LCD 24, and a "rephotographing" operation can be performed upon the user giving instructions to rephotograph (via a manual operation of a button, dial, touch panel, or the like), in accordance with the display on the LCD 24.

As described above, according to the third embodiment, the display controller 40C of the DSP 40' respectively displays the plurality of photographed images taken at the reference position and the plurality of relative positions, respectively, on the LCD 24 in accordance with the "relative shift".

According to the configuration of the DSP 40', even if an electronic shutter is used in imaging processing or a multi-shot mode, the user can recognize when the capturing of one set of images has started and ended. Accordingly, the possibility of the user moving the photographing apparatus during a capturing of a set of images is decreased, so that the picture quality of the one set of captured images, and in turn the synthesized image, can be improved.

For example, the display controller 40C defines a plurality of partial screen areas on the display screen of the LCD 24, and the plurality of captured images obtained at the reference position and the first through third relative positions are sequentially displayed at the plurality of partial screen areas, which correspond to the reference position and the first through third relative positions.

According to the above-described configuration of the DSP 40', the amount of progress of the imaging process of the multi-shot mode can be reliably recognized by the user.

In the case where "rephotographing" is repeatedly performed a plurality of times at a relative position, the display controller 40C sequentially updates the photographed image displayed at the partial image-area that corresponds to this relative position with the rephotographed image.

According to the configuration of the DSP 40', the user can recognize the relative position at which "rephotographing" is repeated. In other words, the user can accurately recognize the progress of the photographing operation in the multi-shot mode.

Furthermore, the display controller 40C can, e.g., display a plurality of captured images on the LCD 24 in a display pattern that corresponds to a pattern of the relative shift of the image sensor 22 and/or the aforementioned optical element (e.g., the photographing lens group 31).

According to the above-described configuration of the DSP 40, in an arrangement in which the progress matches the movement of the multi-shot operation, the amount of progress of the imaging process of the multi-shot mode can be reliably recognized by the user. In other words, the user can artificially discern the path of movement of the movable member (at, least one of the image sensor 22 and the aforementioned optical element) during a multi-shot process.

Modified Embodiment 1

The display controller 40C can display the plurality of photographed images, obtained at the reference position and the plurality of relative positions, on the display screen of the LCD 24 so as to partially overlap each other at shifted positions relative to a predetermined direction.

Figure 10A:
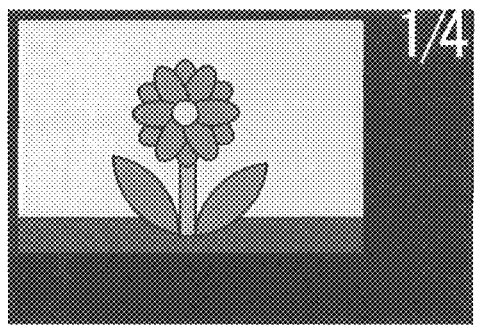
FIGS. 10A, 10B, 10C and 10D are explanatory views of display images, according to a first modification of the third embodiment.
Figure 10B:
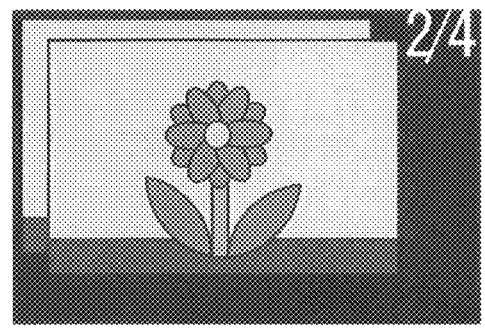
Figure 10C:
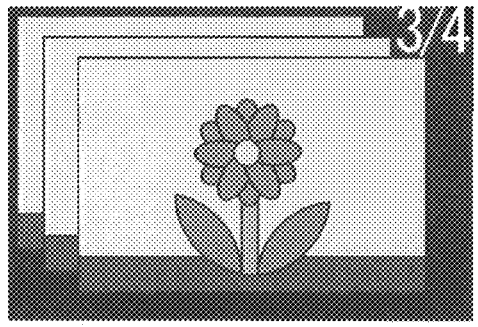
Figure 10D:
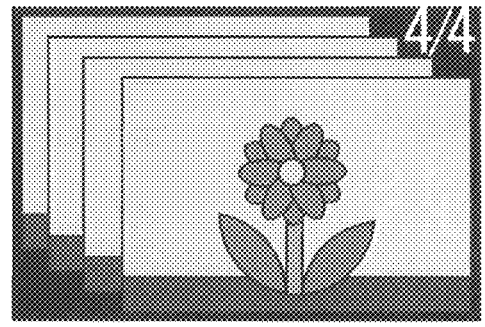

For example, as shown in FIGS. 10A through 10D, the display controller 40C configures the display screen of the LCD 24 so that the plurality of partial screen areas, which respectively correspond to the reference position and the plurality of relative positions, partially overlap each other at shifted positions relative to a predetermined direction. Furthermore, the display controller 40C sequentially displays the plurality of captured images obtained at the reference position and the first through third relative positions at the plurality of partial screen areas, which correspond to the reference position and the first through third relative positions. FIG. 10A shows a display image displayed on the LCD 24 indicating that a photographing operation at the reference position has completed and a photographing operation is currently being carried out at the first relative position. FIG. 10B shows a display image displayed on the LCD 24 indicating that a photographing operation at the first relative position has completed and a photographing operation is currently being carried out at the second relative position. FIG. 10C shows a display image displayed on the LCD 24 indicating that a photographing operation at the second relative position has completed and a photographing operation is currently being carried out at the third relative position. FIG. 10D shows a display image displayed on the LCD 24 indicating that a photographing operation at the third relative position has completed and an image-synthesizing operation is currently being carried out.

Modified Embodiment 2

The display controller 40C can apply "translucent processing" on each of the plurality of captured images obtained at the reference position and at the plurality of relative positions, and the obtained plurality of translucent images can be overlaid onto each other and displayed on the LCD 24. The "translucent processing" refers to a process which adjusts the transparency of the captured image and generates a translucent image. In the present embodiment, since it is assumed that four translucent images will be overlaid onto each other, the display controller 40C can set each of the four translucent images to a transparency of 25% (=¼) so that the sum of transparencies of the four translucent images becomes 100% when overlaid onto each other in sequence.

Figure 11A:
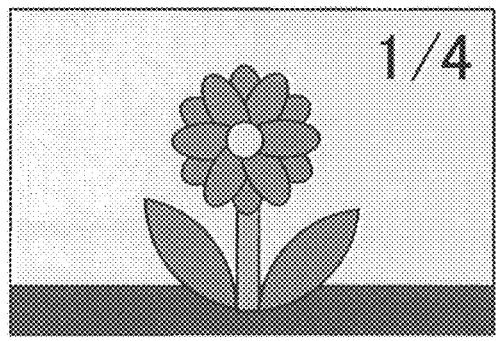
FIGS. 11A, 11B, 11C and 11D are explanatory views of display images, according to a second modification of the third embodiment.
Figure 11B:
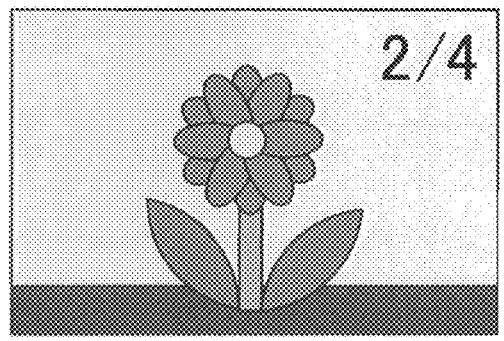
Figure 11C:
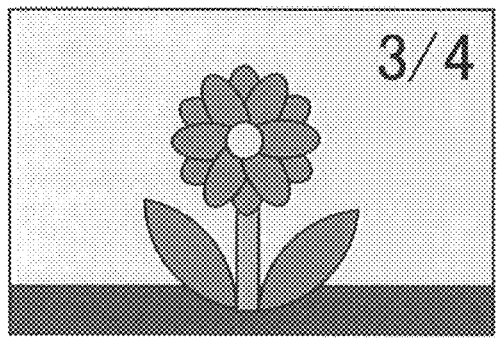
Figure 11D:
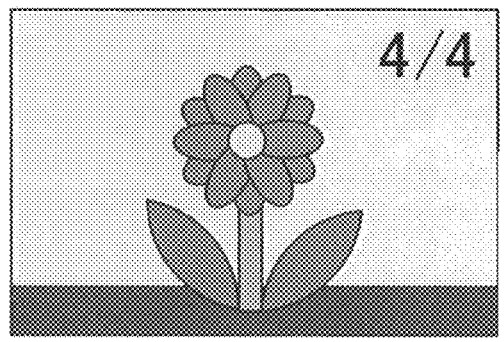

For example, as shown in FIGS. 11A through 11D, the display controller 40C can display the obtained plurality of translucent images on the LCD 24 with the translucent images overlapping each other at shifted positions. FIG. 11A shows a display image displayed on the LCD 24 indicating that a photographing operation at the reference position has completed and a photographing operation is currently being carried out at the first relative position. FIG. 11B shows a display image displayed on the LCD 24 indicating that a photographing operation at the first relative position has completed and a photographing operation is currently being carried out at the second relative position. FIG. 11C shows a display image displayed on the LCD 24 indicating that a photographing operation at the second relative position has completed and a photographing operation is currently being carried out at the third relative position. FIG. 11D shows a display image displayed on the LCD 24 indicating that a photographing operation at the third relative position has completed and an image-synthesizing operation is currently being carried out. Although the amount of shift of the positions at which the translucent images are respectively displayed is not limited to a particular amount, the amount of shift can, e.g., correspond to the above-described "relative shift pattern". In other words, in the case where the above-described "relative shift pattern" is a pattern that relatively moves at a pitch of 1 pixel, the amount of shift of the display position can be set to "a pitch of 1 pixel". Alternatively, the amount of shift of the display position can be set to an amount greater than "a pitch of 1 pixel".

Other Modified Embodiments

[1] Each of the first through third embodiments discuss an example in which four photographing images, which are taken (imaged) in the PSR photographing mode (PSR photographing process) by driving (moving) the image sensor 22 in a square movement path at a pitch of one pixel in a plane orthogonal to the optical axis, are designated as a "set of images configured of a plurality of captured images". However, various design changes are possible since there is a certain degree of freedom in regard to the movement path and pitch by which the image sensor 22 is driven (moved), and also in regard to the number of images of the "set of images configured of a plurality of captured images", and as to how these images are displayed. For example, as described in the third embodiment, a split-screen display of the images that constitute the set of images can be carried out, or the images that constitute the set of images can be sequentially displayed in a repeated manner. Furthermore, the direction in which the image sensor 22 is driven (moved) is not limited to within a plane that is orthogonal to the optical axis of the photographing optical system, so long as the driving (movement) direction of the image sensor 22 is different to that of the optical axis of the photographing optical system. In addition, the "set of images configured of a plurality of captured images" are not limited to images that are obtained (photographed/imaged) in the PSR photographing mode, so long as the images have been photographed (imaged) in succession while a change(s) has occurred in the photographing condition(s) of the same object (subject).

[2] in the first through third embodiments, the image sensor 22 is described as a "movable member" that is configured to drive (move) within a plane that is orthogonal to the optical axis; however, the present invention is not limited thereto. For example, a configuration is possible in which an optical element constituting at least a part of the photographing lens group (photographing optical system) 31 can be used as a "movable member" which is driven (moved) in a plane that is orthogonal to the optical axis by a voice coil motor provided in the photographing lens 30. Alternatively, a configuration is possible in which an optical element that includes at least part of both the image sensor 22 and the photographing lens group 31 is used as a "movable member" that is driven (moved) within a plane that is orthogonal to the optical axis.

[3] In the first through third embodiments, although the DSP 40 and the image sensor drive circuit 60 are portrayed as separate components (blocks), it is also possible to configure these components as a single component (block).

[4] in the first through third embodiments, although an example of a configuration of the image-shake correction device 50 is described in which the magnets M1, M2 and M3 and the yokes Y1, Y2 and Y3 are fixed onto the mount support plate 51, and the drive coils C1, C2 and C3 are fixed onto the movable stage 52; a reversed positional relationship is possible in which magnets and yokes are fixed onto a movable stage, and drive coils are fixed onto a mount support plate.

[5] In the first through third embodiments, although an example in which the camera body 20 and the photographing lens 30 are detachably attached to each other (lens interchangeable) has been discussed, a configuration in which the camera body 20 and the photographing lens 30 are not detachable (non lens interchangeable) is also possible.

[6] In the first through third embodiments, although an example is given in which the imaging apparatus of the present invention is applied to a so-called mirrorless digital camera, the present invention is not limited thereto, the imaging apparatus can be an SLR digital camera provided with a movable mirror (quick-return mirror). In the case where the technology disclosed in the first through third embodiments is applied to an SLR digital camera, when (or before) the preliminary photographing operation is carried out at the reference position, the movable mirror is moved up from a viewing position to a ready-to-photograph position and the shutter is fully opened, and thereafter in this state, a first photographing image at the reference position is captured (photographed) followed by three photographing images at the relative positions being captured. When all photographing images have been captured, or thereafter, the shutter is fully closed and the movable mirror is moved (returned) down to the viewing position.

Although the digital camera 10 has been described herein as a photographing apparatus/imaging apparatus to which the present invention is applied, the present invention can also be applied to any device which includes a lens system, an image sensor and an image processor, for example: a smart device that is provided with an in-built digital camera (photographing apparatus/imaging apparatus) such as a smart phone or a tablet computer, or a video camera that is capable of taking a plurality of still images (pictures).

Obvious changes may be made in the specific embodiments of the present invention described herein, such modifications being within the spirit and scope of the invention claimed. It is indicated that all matter contained herein is illustrative and does not limit, the scope of the present invention.

What is claimed is:

1. A photographing apparatus comprising:
an image sensor configured to convert an object image formed by a photographing optical system, of said photographing apparatus, into electrical pixel signals, said photographing optical system including an optical element; and
a photographing controller configured to control a photographing operation, in which a set of images, configured of a plurality of captured images, for use in an image-synthesizing operation are photographed, wherein, during said photographing operation, said image sensor and said optical element are sequentially moved relative to each other from a reference position to a plurality of different relative positions in a direction that is different to a direction of the optical axis,
wherein every time said photographing controller obtains a photographed image at each relative position, said photographing controller determines whether or not said photographed image satisfies usage testing-requirements for a constituent image of said set of images.

2. The photographing apparatus according to claim 1, wherein, at each relative position, said imaging controller repeatedly rephotographs until the obtained photographed image satisfies said usage testing-requirements, and upon said usage testing-requirements being satisfied, said obtained photographed image that satisfies said usage testing-requirements is retained as a constituent image of said set of images, and said image sensor and said optical element are relatively moved to a subsequent relative position.

3. The photographing apparatus according to claim 2, wherein said photographing controller designates a photographed image obtained at said reference position, or the photographed image obtained at a relative position immediately before a current relative position out of said plurality of different relative positions, as a reference image and designates a photographed image obtained at said current relative position as a comparative image, and
wherein said photographing controller determines whether or not the photograph image obtained at said current relative position satisfies said usage testing-requirements based on the amount of difference between values of usage testing determination parameters of said reference image and values of usage testing determination parameters of said comparative image.

4. The photographing apparatus according to claim 3, wherein each of said usage testing determination parameters of said reference image and said usage testing determination parameters of said comparative image comprises a luminance histogram of a determining image-area,
wherein said photographing controller determines that said usage testing-requirements are not satisfied in the case where a difference between the luminance histogram at the determining image-area of said reference image and the luminance histogram at the determining image-area of said comparative image is greater than or equal to a determining threshold value.

5. The photographing apparatus according to claim 3, wherein each of said usage testing determination parameters of said reference image and said usage testing determination parameters of said comparative image comprises an RGB value of a determining image-area,
wherein said photographing controller determines that said usage testing-requirements are not satisfied in the case where a difference between the RGB value at the determining image-area of said reference image and the RGB value at the determining image-area of said comparative image is greater than or equal to a determining threshold value.

6. The photographing apparatus according to claim 3, wherein each of said usage testing determination parameters of said reference image and said usage testing determination parameters of said comparative image comprises a luminance histogram of a first determining image-area and an RGB value of a second determining image-area,
wherein said photographing controller determines that said usage testing-requirements are satisfied in the case where a first difference value between the luminance histogram at said first determining image-area of said reference image and the luminance histogram at said first determining image-area of said comparative image is less than a first determining threshold value, and a second difference value between the RGB value at said second determining image-area of said reference image and the RGB value at said second determining image-area of said comparative image is less than a second determining threshold value, and
wherein said photographing controller determines that said usage testing-requirements are not satisfied in the case where at least one of said first difference value is greater than or equal to said first determining threshold value and said second difference value is greater than or equal to said second determining threshold value.

7. The photographing apparatus according to claim 2, wherein said photographing controller calculates a difference between values of usage testing determination parameters of said reference image and values of usage testing determination parameters of said comparative image for each of a plurality of image-areas, wherein said photographing controller designates a photographed image obtained at said reference position, or the photographed image obtained at a relative position immediately before a current relative position out of said plurality of different relative positions, as a reference image and designates a photographed image obtained at said current relative position as a comparative image,
wherein said photographing controller calculates a sum total area of said determining image-areas, to which the calculated said difference is greater than or equal to a third determining threshold value, relative to an entire image area of said comparative image,
wherein if the calculated said ratio is less than a fourth determining threshold value, said photographing controller determines that said usage testing-requirements have been satisfied, and
wherein if the calculated said ratio is greater than or equal to said fourth determining threshold value, said photographing controller determines that said usage testing-requirements have not been satisfied.

8. The photographing apparatus according to claim 7, further comprising an image processor configured to generate a synthesized image using said image set, which is obtained at a stage where all constituent images that configure said image set have been obtained by said photographing controller,
wherein in the case where said usage testing-requirements are satisfied, said image processor replaces an image of a partial-image area, of said synthesized image that corresponds to the determining image-area to which the calculated difference is greater than or equal to said third determining threshold value, with a corresponding partial-image area of said reference image.

9. A photographing controller configured to control a photographing operation, in which a set of images, configured of a plurality of captured images, for use in an image-synthesizing operation are photographed, wherein, during said photographing operation, said image sensor and said optical element are sequentially moved relative to each other from a reference position to a plurality of different relative positions in a direction that is different to a direction of the optical axis, said photographing controller comprising:
a photographing controller configured to determine, every time said photographing controller obtains a photographed image at each relative position, whether or not said photographed image satisfies usage testing-requirements for a constituent image of said set of images.

10. A photographing control method comprising:
controlling a photographing operation, in which a set of images, configured of a plurality of captured images, for use in an image-synthesizing operation are photographed, wherein, during said photographing operation, said image sensor and said optical element are sequentially moved relative to each other from a reference position to a plurality of different relative positions in a direction that is different to a direction of the optical axis; and
determining, every time said photographing controller obtains a photographed image at each relative position, whether or not said photographed image satisfies usage testing-requirements for a constituent image of said set of images.

11. A non-transitory computer readable storage medium for storing a photographing control program, to be implemented by a photographing controller of a photographing apparatus during a photographing operation,
in which a set of images, configured of a plurality of captured images, for use in an image-synthesizing operation are photographed, wherein, during said photographing operation, said image sensor and said optical element are sequentially moved relative to each other from a reference position to a plurality of different relative positions in a direction that is different to a direction of the optical axis, wherein said photographing control program implements a process that determines, every time said photographing controller obtains a photographed image at each relative position, whether or not said photographed image satisfies usage testing-requirements for a constituent image of said set of images.

* * * * *